United States Patent [19]

Barton et al.

[11] 4,013,186

[45] Mar. 22, 1977

[54] TIRE PRESS UNLOADER

[75] Inventors: Dale S. Barton, Columbiana; Ben Stoyanov, Akron, both of Ohio; Robert M. Staats, Beaver Falls, Pa.

[73] Assignee: NRM Corporation, Akron, Ohio

[22] Filed: Dec. 24, 1974

[21] Appl. No.: 536,252

[52] U.S. Cl. .......................... 214/660; 214/701 P; 214/674; 214/730; 214/1 BD; 214/149; 425/38; 100/218

[51] Int. Cl.² .......................................... B65G 61/00

[58] Field of Search ................ 214/1 BD, 1 R, 700, 214/1 Q, 701 P, 130 R, 130 A, 130 C, 149, 674, 730, 660, 77; 100/218; 425/32, 38

[56] References Cited

UNITED STATES PATENTS

| | | | |
|---|---|---|---|
| 1,562,750 | 11/1925 | Floyd | 214/130 R |
| 2,786,588 | 3/1957 | Hill | 214/130 C X |
| 2,828,870 | 4/1958 | Corley | 214/1 SW |
| 2,897,991 | 8/1959 | Wagner | 214/701 P |
| 2,948,417 | 8/1960 | Haanes | 214/1 BD |
| 2,978,741 | 4/1961 | Soderquist | 425/38 X |
| 3,040,685 | 6/1962 | Ridley | 214/1 BD X |
| 3,141,191 | 7/1964 | Soderquist | 214/1 BD X |
| 3,378,882 | 4/1968 | Turu et al. | 428/38 |
| 3,477,100 | 11/1969 | Pech et al. | 425/38 X |

FOREIGN PATENTS OR APPLICATIONS

| | | | |
|---|---|---|---|
| 253,425 | 4/1967 | Austria | 214/700 |
| 910,112 | 4/1954 | Germany | 214/130 R |
| 485,698 | 11/1929 | Germany | 214/130 R |

*Primary Examiner*—Frank E. Werner
*Attorney, Agent, or Firm*—Donnelly, Maky, Renner & Otto

[57] ABSTRACT

A tire press unloader for use with a tire press of the standing bladder type which includes a vertically extensible elevator stanchion pivoted at its lower end at the back of the press and pivotally supporting a conveyor platform. When the press is opened and the cured tire has been elevated by the bladder mechanism, the conveyor platform is positioned beneath the cured tire on firm supports to provide an unyielding horizontal platform engaging and supporting the tire as the bladder is stripped therefrom. When the green tire is on the platform clear of the bladder, the platform elevates and then tilts backwardly to lift the cured tire over the top of the standing bladder mechanism. The tire then rolls down to a tire stop and the platform retracts. Cam stop means may be provided as the platform descends with the tire causing the platform to tilt at least partially to clear the motor housing or other parts of the press. The firm support for the platform in the horizontal tire receiving position is provided in part by post supports at the side of the press which may swing to clear the heat shield in response to retraction of the unloader, and vice versa.

33 Claims, 14 Drawing Figures

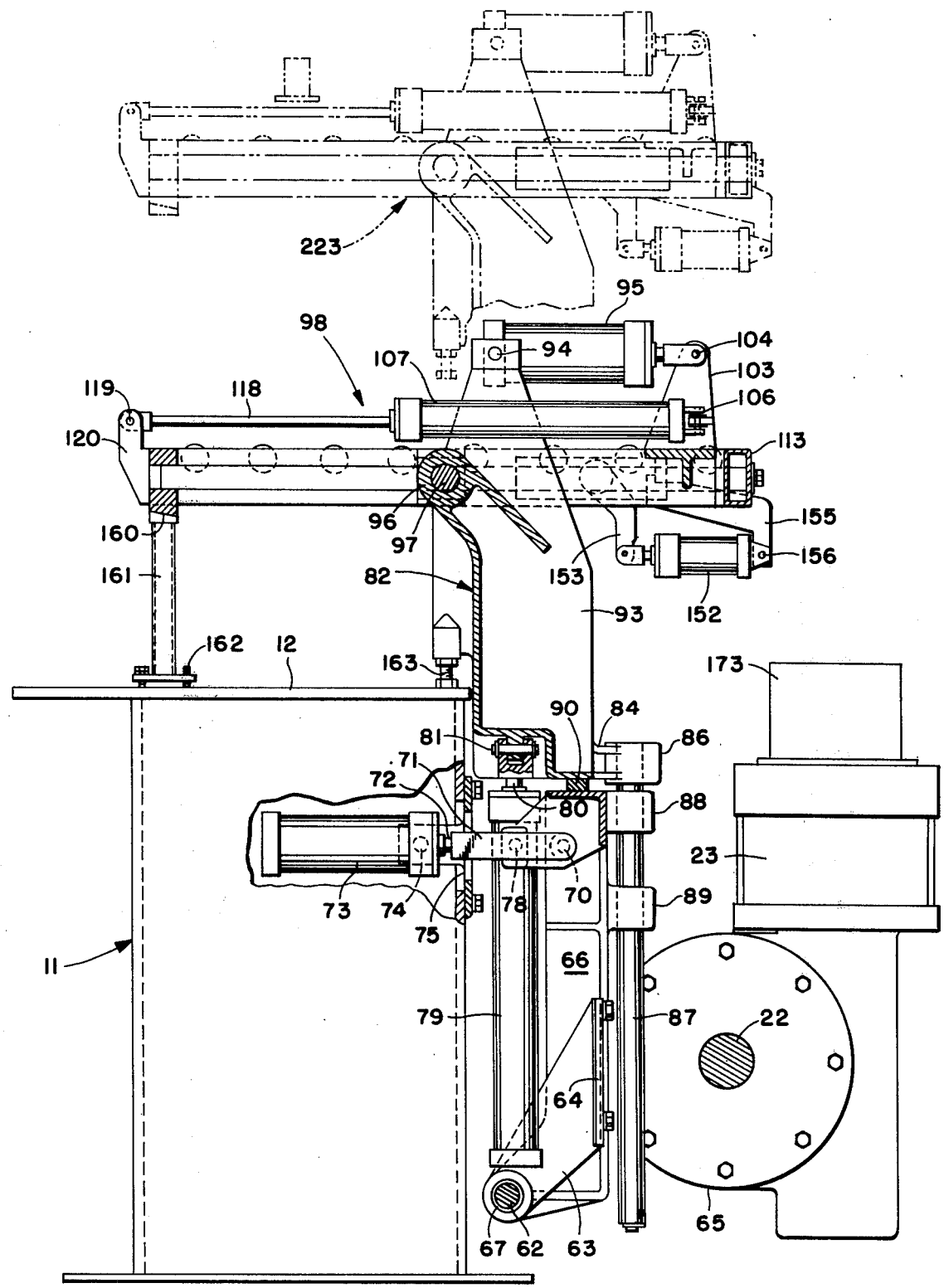

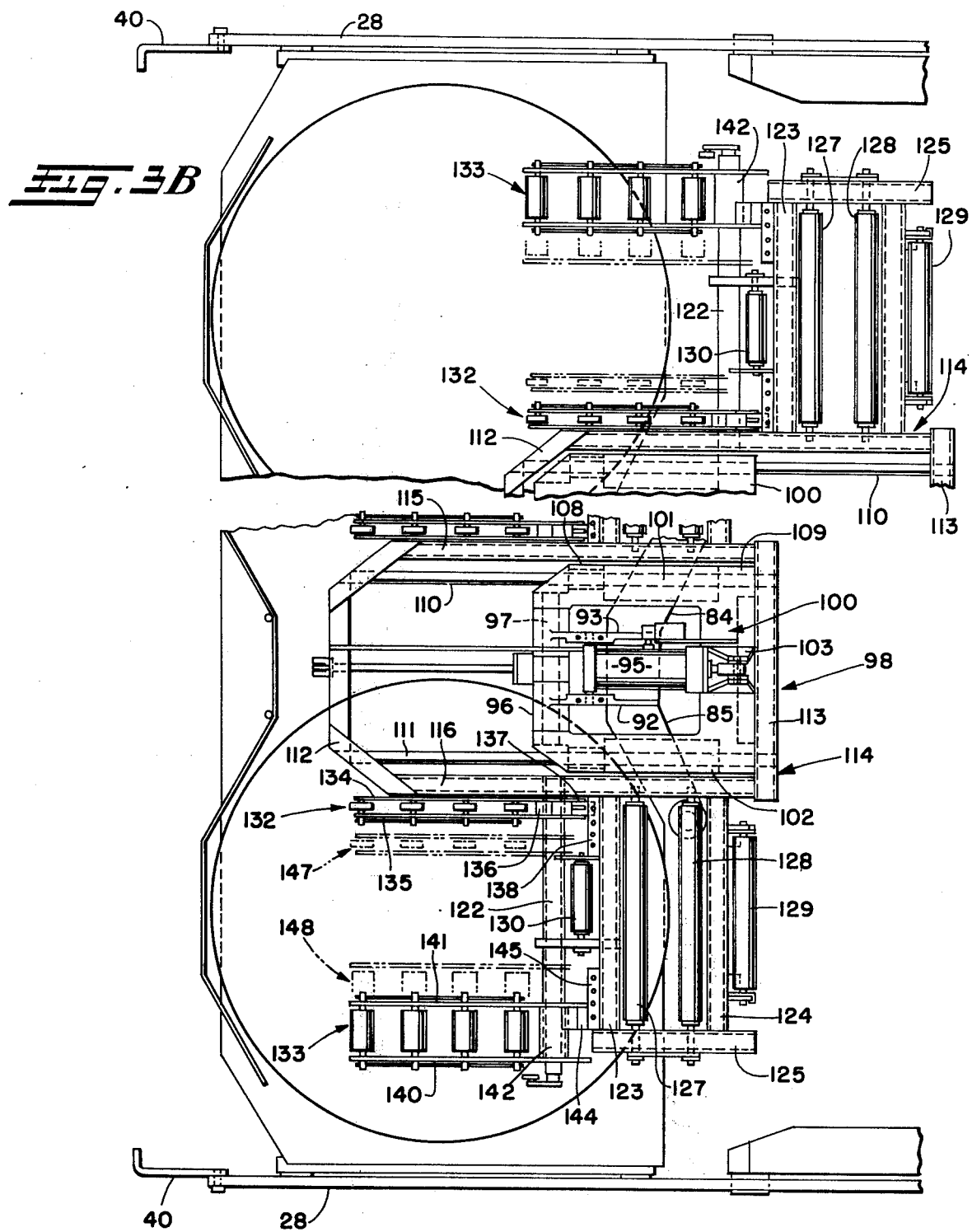

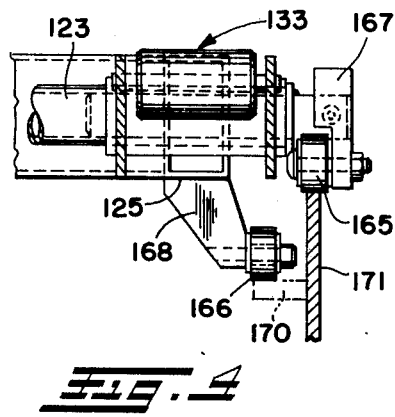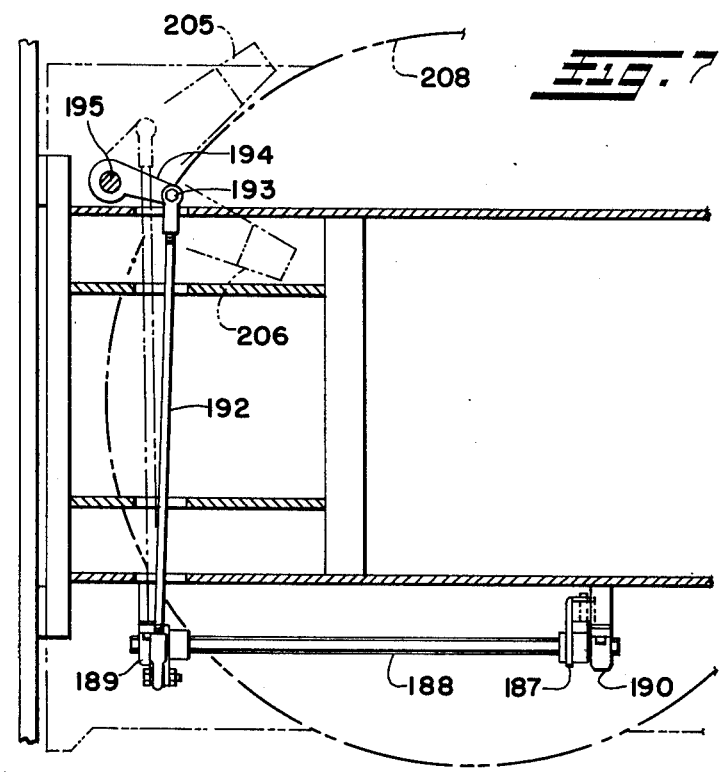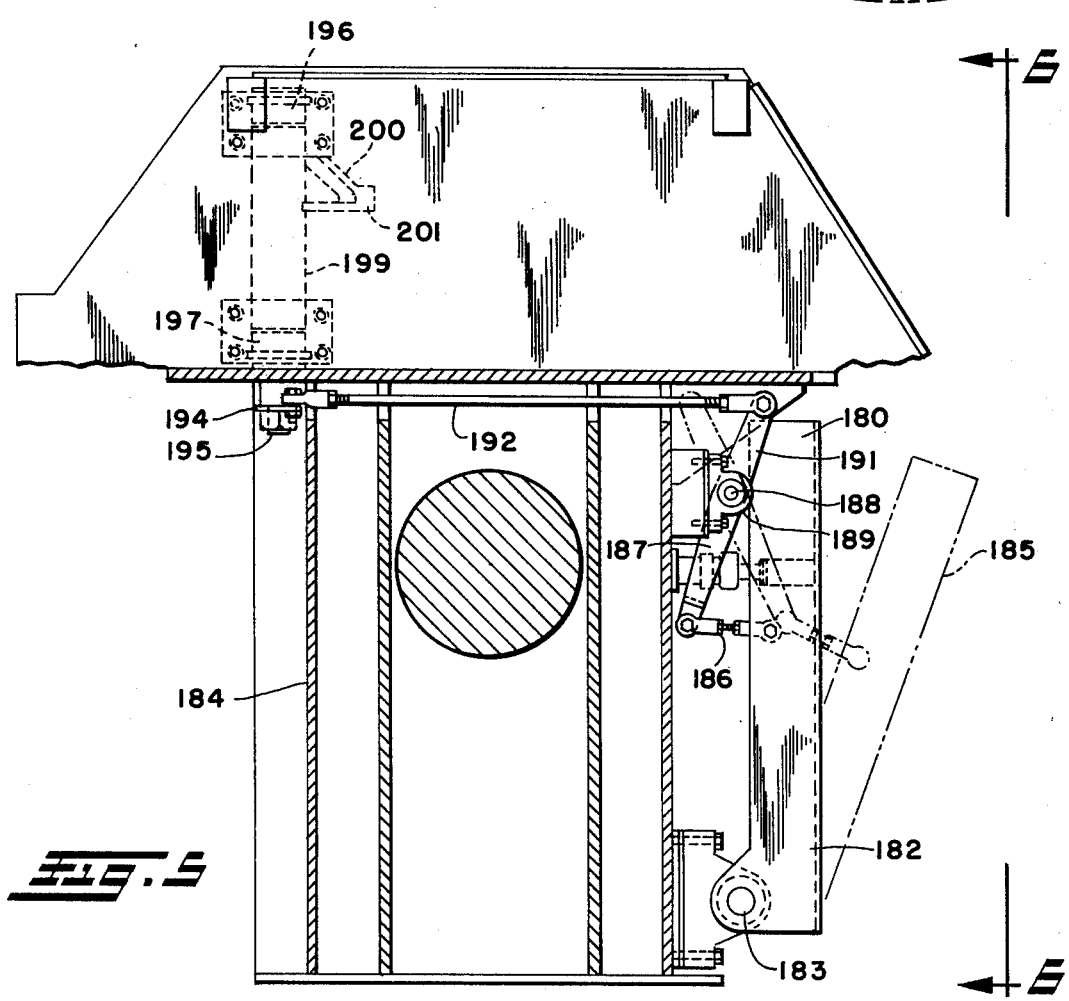

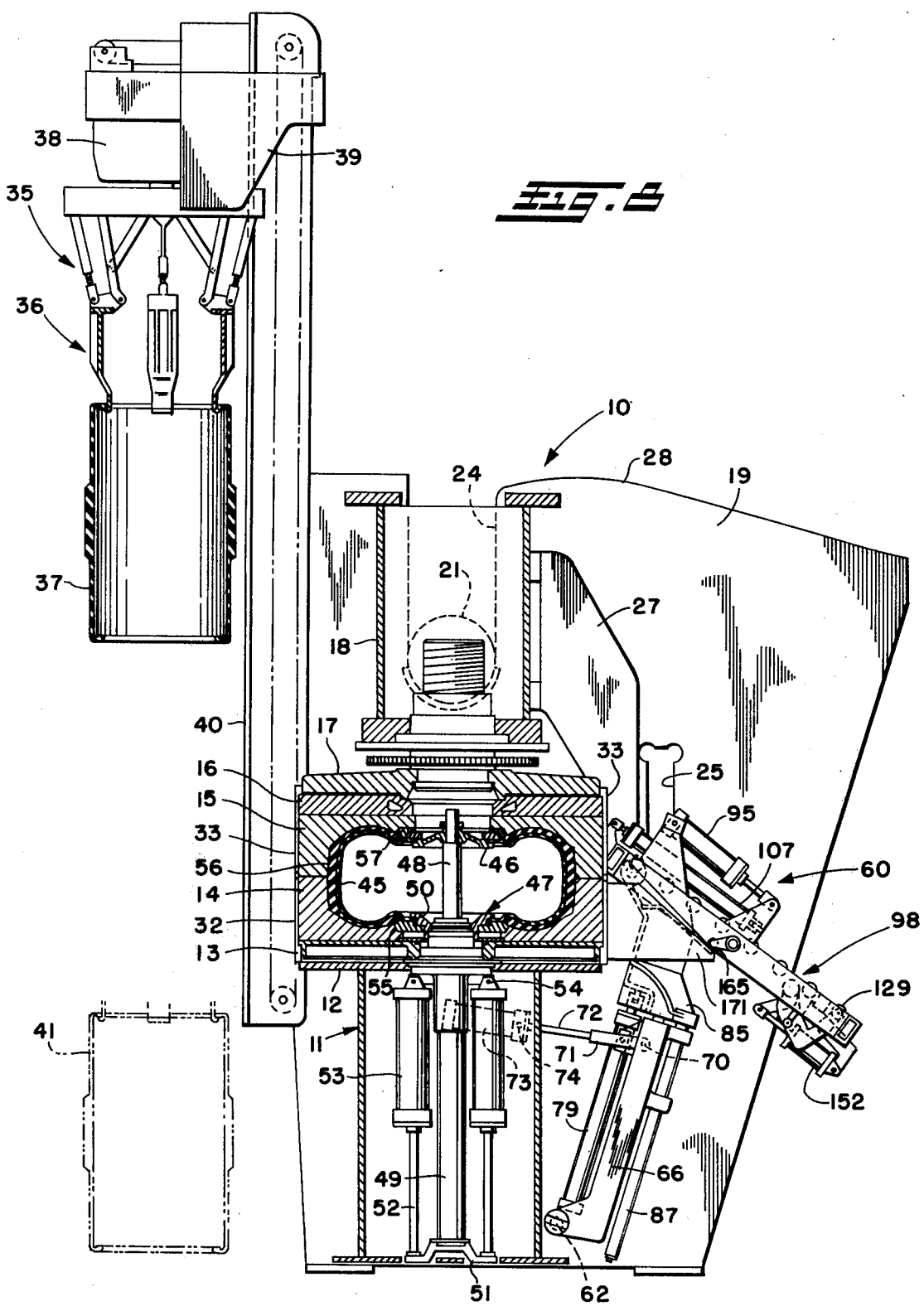

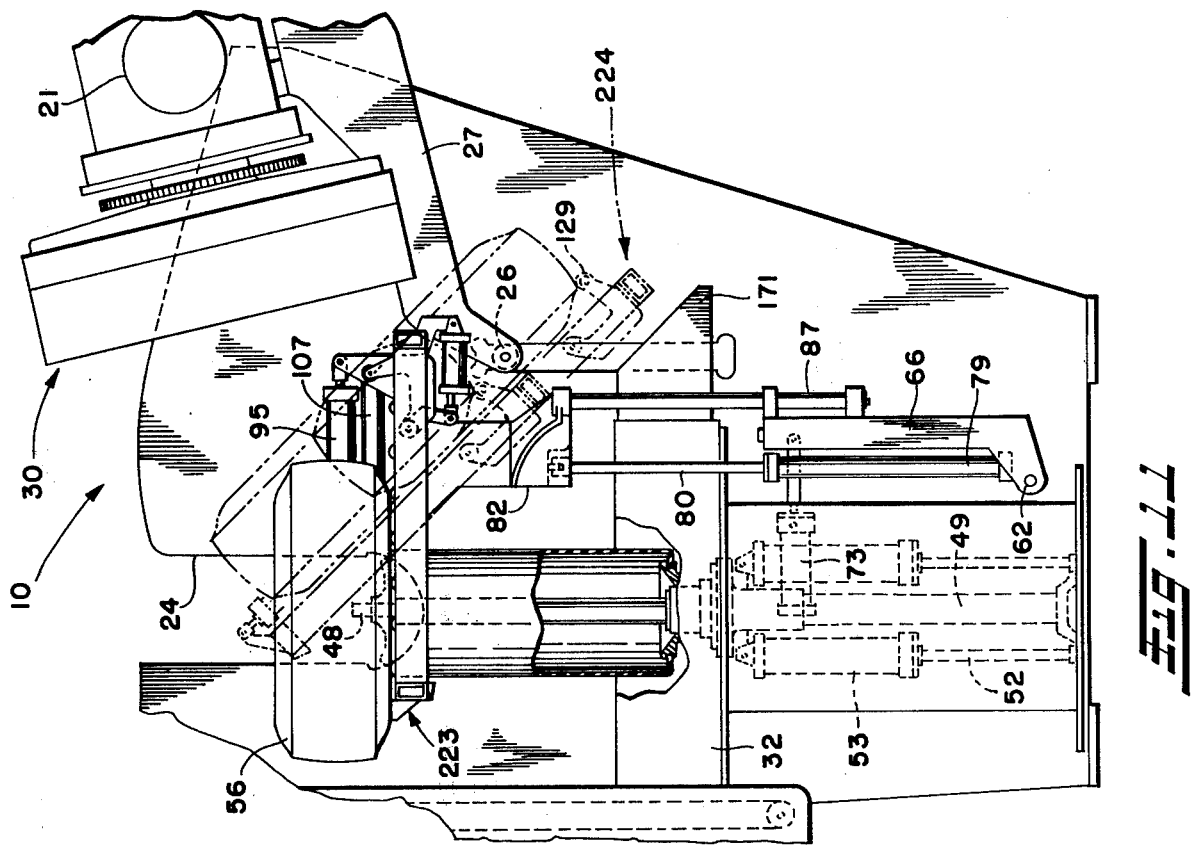
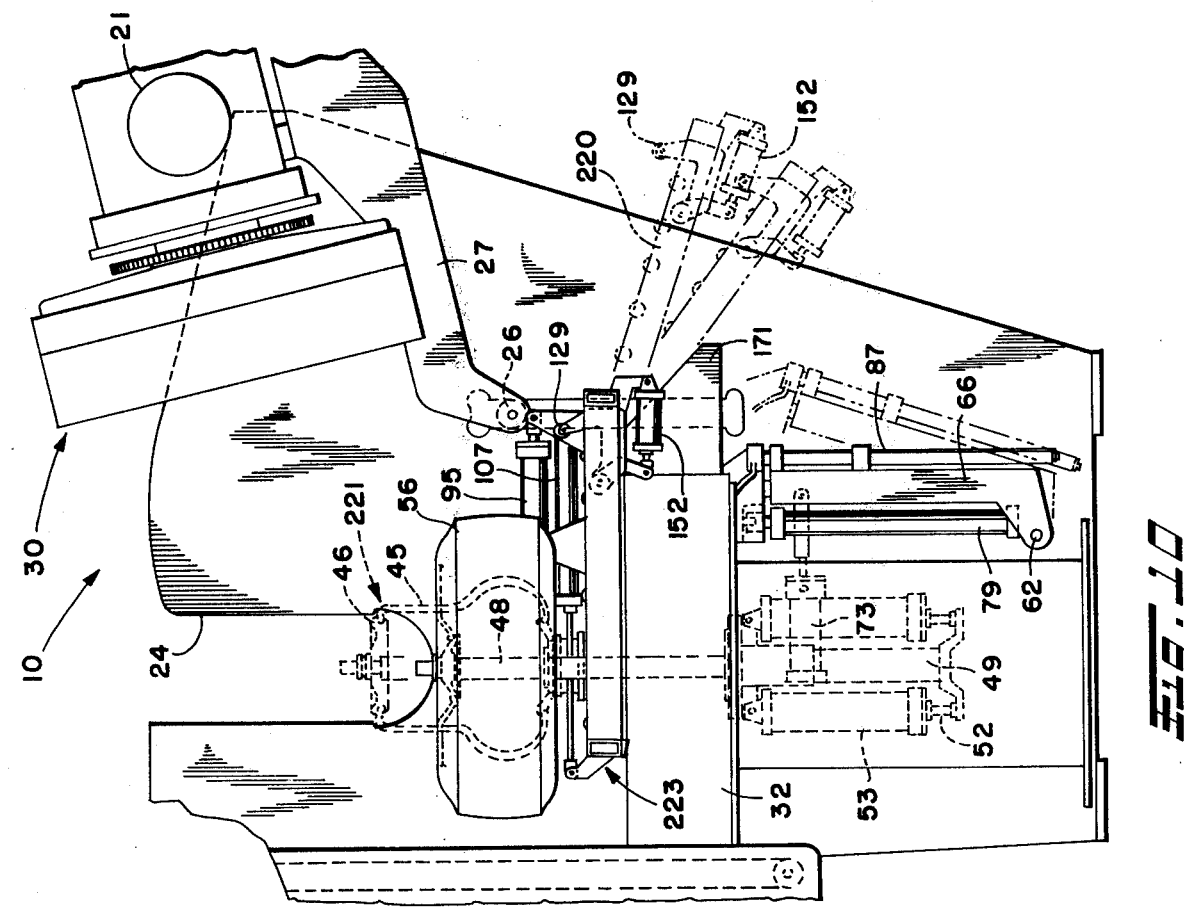

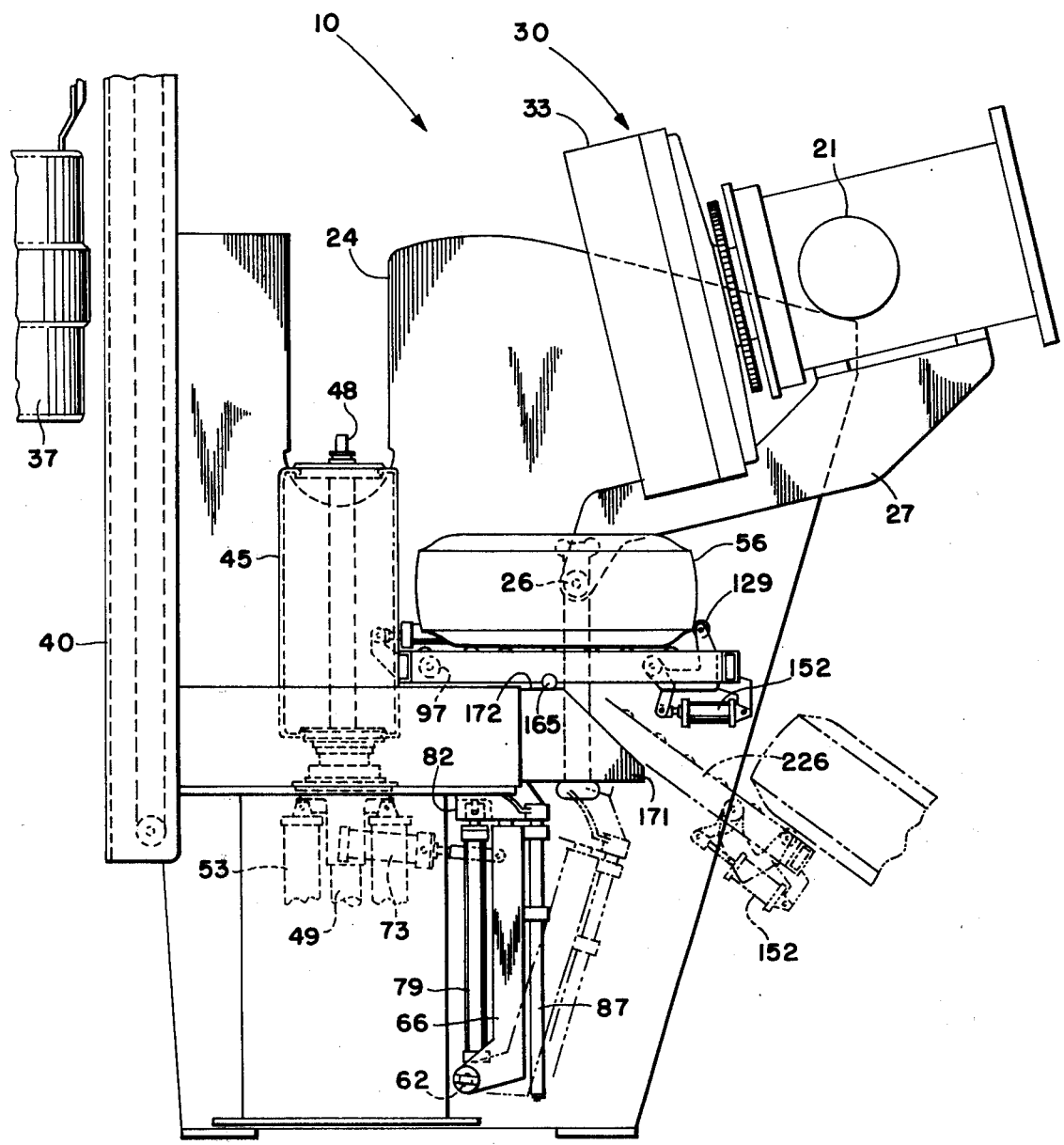

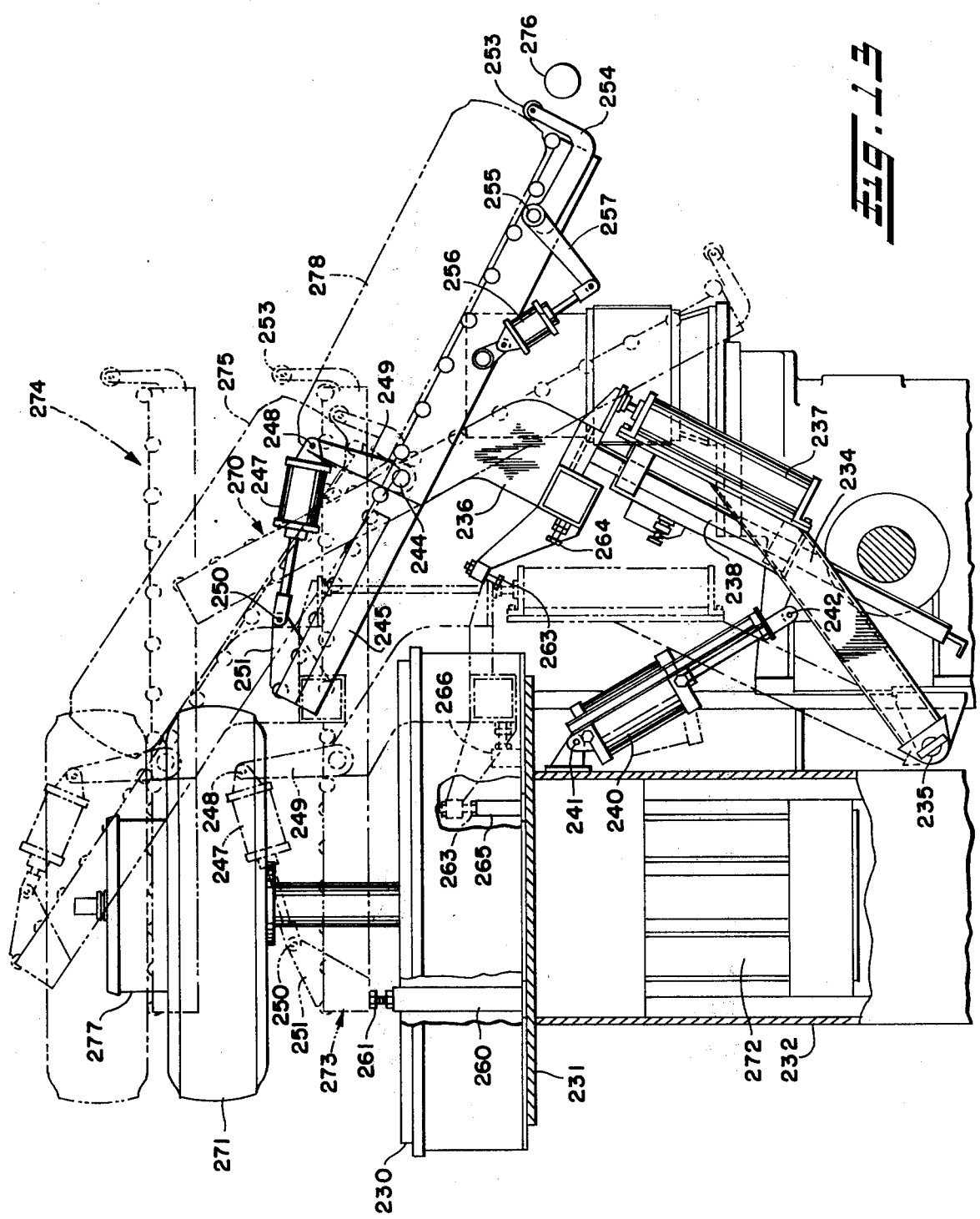

TIRE PRESS UNLOADER

This invention relates generally as indicated to a tire press unloader and more particularly to an unloader for a standing bladder type tire curing press.

It is old to pivot platforms into tire curing presses to receive cured tires for removal from the press. The problem of unloading a cured tire is accentuated by the presence of an upstanding bladder, particularly if the bladder is stripped downwardly while the tire is supported on the unloader. The problem is further complicated by the post cure inflation of tires after curing in that the tires must be properly presented to the post cure inflator to ensure automatic operation.

Examples of prior tire press unloaders may be seen in the following U.S. Pat. Nos.: 2,314,120 — Braun; 2,169,146 — Iversson; 3,222,716 — Harris; 3,075,237; 2,832,991; 2,832,992; 2,911,670; 3,141,191 and 3,336,630 — all to Soderquist.

The force exerted by the bladder in stripping the same from the cured tire can be substantial and the force may be released very suddenly as the bladder comes out of the tire. If the tire, as the bladder is being stripped, is supported on a yielding platform, the platform may actually propel the tire over the top of the bladder much like a slingshot. Accordingly, it is important to provide a rigid, well-supported platform engaging the tire to react against the force of the bladder as it is stripped from the tire. It is also important to provide positive control of the tire as it is elevated over the upstanding bladder mechanism and then descends to the entry of the post cure inflator (P.C.I.). It is also important not to permit the tire to move too fast or to stop too suddenly since it may then get away from the unloader mechanism. The problems of unloading are further complicated by relatively close clearances between the tire and projecting parts of the press such as the main motor housing or the top mold section heat shield when the press is open.

It is accordingly a principal object of the present invention to provide a tire press unloader having a rigid, nonyielding platform beneath the cured tires so that the bladder may be stripped downwardly therefrom.

Another principal object of the present invention is the provision of a tire press unloader providing positive control of the cured tire from the press to the post cure inflator.

Another important object is the provision of a tire press unloader which can be operated to clear the post of the center mechanism, the press head when open and closed, and other parts of the press.

yet another important object is the provision of a tire press unloader accomplishing the above objectives by the provision of a platform pivotally mounted on the top of an elevator stanchion in turn pivoted to the rear of the press.

Still another important object is the provision of such an unloader wherein the platform can be pivoted to an almost vertical position between the press and P.C.I. when not in use.

A further important object is the provision of an unloader as set forth above wherein the platform can be moved fore and aft of the elevator stanchion pivot.

Still another object is the provision of post supports for the platform of the unloader at the front of the press which may be operated in conjunction with the unloader to clear the heat shield of the press when the loader is retracted and to extend to a platform supporting position when the loader is extended.

Still another object is the provision of a tire unloader pivoted to the top of an elevator stanchion and utilizing cam stops to pivot the tire supporting platform for clearance purposes as the cured tire is brought downwardly.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 2 is a view similar to FIG. 1 but showing the platform of the unloader in its extended horizontal position, and also, in phantom lines, in elevated horizontal position;

FIG. 3A is a fragmentary top plan view of the unloader with the platform extended;

FIG. 3B is a view similar to FIG. 3A showing the platform retracted;

FIG. 4 is an enlarged vertical section showing the cam stops and followers which control the pivot of the loader platform upon descent of the tire;

FIG. 7 is a fragmentary horizontal section of the mechanism illustrated in FIGS. 5 and 6;

FIG. 8 is a schematic view of the entire press partially broken away and in section illustrating the unloader in its down and retracted position;

FIG. 9 is a partial schematic view similar to FIG. 8 showing the press opened and a cured tire elevated on the center mechanism;

FIG. 10 is a schematic view similar to FIG. 9 showing the unloader platform tilted and extended into position to receive the cured tire as the bladder is stripped downwardly therefrom;

FIG. 11 is a schematic view showing the tire elevated over the upstanding bladder and, in phantom lines, tilted to bring the tire against the tire stop;

Figure 1:
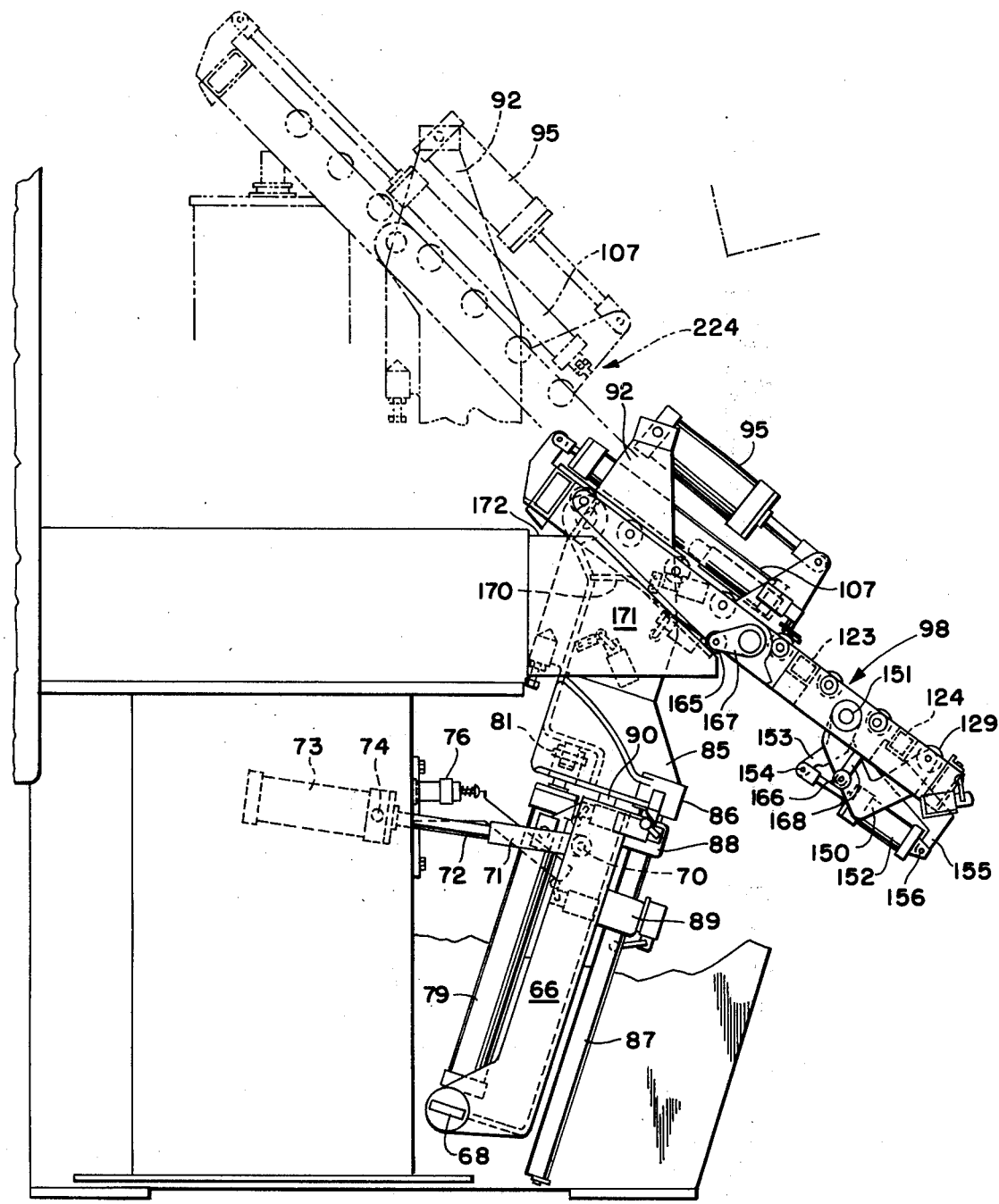
FIG. 1 is a fragmentary side elevation of an unloader in accordance with the present invention with parts of the press broken away or shown in phantom lines for clarity of illustration, and showing the unloader in full lines retracted and in its maximum elevated tilted position in phantom lines.

FIG. 12 is a further schematic view illustrating the tire in full lines in an intermediate position after the tire has been brought to a substantially horizontal position by the operation of the cam stops and followers, and in phantom lines the tire is shown exiting into the P.C.I. after the unloader has been brought to its fully retracted position and the tire stop lowered; and FIG. 13 is a fragmentary side elevation similar to FIG. 1 of another embodiment of the present invention showing some of the positions of the unloader in phantom lines.

Referring now to the drawings and more particularly to several of the schematic figures such as FIG. 8, it will be seen that the unloader of the present invention can be utilized with a tire press 10 of the type shown. The unloader of the present invention is, of course, useful with tire presses other than the types illustrated.

The press 10 seen in FIG. 8 comprises a fabricated base frame 11 having a main support plate 12 on which is supported a platen 13 and a bottom mold section 14. The bottom mold section is stationary with respect to a top mold section 15 and its platen 16 which is pendently adjustably supported through bolster 17 from press head 18.

The press head 18 is in the form of a beam which extends between two side plates 19. On each end of the beam, pins extend outwardly supporting trunnions 21, such pins in turn being connected by side links to bull gears at each side of the press. The bull gears are driven from pinion shaft 22 in turn driven by main motor 23 through a cone drive seen in FIG. 2. As the bull gears rotate in a clockwise direction as viewed in FIG. 8, the trunnions 21 are elevated causing the press head 18 to elevate with the trunnion rollers 21 riding along the vertical edge 24 of the side plates 19. A vertical slot 25 is also provided in the side plates parallel to the guide edge 24, and rollers 26 ride in such guide slots, such rollers in turn being mounted on the distal ends of arms 27 secured to the press head. Accordingly, as the press begins to open, the top mold section 15 will move vertically upwardly maintaining its parellelism with the bottom mold section 14 until the trunnions 21 begin to ride backwardly along the top surface 28 of the side plates 19. Since the rollers 26 are confined in the vertical slots 25, the press head and the top mold section will move to the tilted full open position seen at 30 in FIGS. 9 through 12. Both mold halves are surrounded by heat shields seen at 32 for the lower mold half 14 and 33 for the upper mold half 15. Such heat shields constitute the outer envelope of the molds, and as such, create the clearance problems for unloading.

The front of the press seen at the left in FIG. 8, is provided with a loader shown generally at 35 which includes a chuck 36 adapted to engage and grip a green tire 37. The chuck 36 is mounted for fore and aft movement on a floating frame 38 in turn supported on a elevator frame 39 which is in turn mounted for vertical movement on elevator rails 40 which may be secured to the side plates 19 of the press. The loader may pick a green tire up from the floor in front of the press as shown by the phantom line position 41. When the press is opened and the top mold has been cleared for loading, the floating frame of the loader will traverse to the right or rear as seen in FIG. 8 and then move vertically downwardly for loading. The loader forms no part of the present invention and is disclosed and claimed in co-pending application Ser. No. 523,563, filed Nov. 14, 1974, entitled "Green Tire Loader" and having common ownership with the present application.

The press 10 is equipped with an upstanding bladder mechanism which is, of course, upstanding only when the press is opened. The bladder mechanism is shown upstanding in FIG. 11 and FIG. 12, but is shown in the curing and shaping position in FIG. 8. The bladder is a cylindrical diaphragm 45 having upper and lower beads clamped by upper and lower bead ring assemblies 46 and 47, respectively. Post 48 supports the upper bladder bead ring assembly 46 and the post is in turn supported on a piston within post cylinder 49. The upper end of the post cylinder 49 supports the lower bead ring assembly which includes spray ring 50 for the circulation of curing medium within the bladder during shaping and curing. The lower end of the post cylinder 49 is supported on spider 51 connected to the rods 52 of bead lift cylinders 53, the blind ends of which are pivotally connected at 54 to the base of the press. Accordingly, the bead lift cylinders 53, when retracted, elevate the entire center mechanism. The bead shaping ring 55 which underlies the bottom bead of the tire is a part of the bottom bladder bead ring assembly 47 and when the center mechanism is elevated, the cured tire 56 will move therewith. In contrast, the upper bead ring 57 is mounted on the upper mold section and moves therewith when the press opens as seen in FIG. 9. In FIG. 9, the bead lift cylinders 53 have retracted elevating the cured tire 56 stripping it from the bottom mold section. The opening of the press, of course, strips the tire from the top mold section. In the position of FIG. 9, a cured tire is now ready for unloading, and this is accomplished by the unloader shown generally at 60 in its retracted position in FIGS. 8 and 9.

It will be appreciated that most presses manufactured today are known as dual cavity presses wherein there are two side-by-side molds. This side-by-side positioning of the molds can be seen viewing FIGS. 3A and 3B together.

Reverting now to FIGS. 1, 2, 3A and 3B, it will be seen that the unloader is pivotally supported on pivot shafts 62 which are secured by brackets 63 mounted on plates 64 on the housing of cone drive 65. There are preferably two substantially axially spaced pivot shafts 62, each of which supports one downwardly extending leg of inverted U-shape stanchion 66. The shafts 62 are mounted in bushings 67 in the brackets, and such shafts are secured by keepers 68 to the legs of the stanchion. The stanchion is inverted U-shape in construction so that it will clear the cone drive housing for the pinion shaft 22.

Pivoted at 70 to the top of the stanchion is rod clevis 71 connected to the rod 72 of piston cylinder assembly 73, the cylinder of which is pivoted at 74 to bracket 75 secured to the base of the press. Retraction of the piston cylinder assembly 73 will move the stanchion from the position seen in FIG. 1 to the vertical position seen in FIG. 2. One or more shock absorbers 76 may be mounted on the base of the press to cushion the elevator stanchion and thus the unloader as it moves to the vertical position.

The top of the stanchion 66 also pivotally supports at 78 elevator or lift cylinder 79, the rod 80 of which is connected by clevis 81 to elevator 82.

The elevator 82 is in the form of a relatively large casting and includes at its lower end two outwardly spread arms 84 and 85, the spread of which is seen more clearly in FIG. 3A, each arm has a boss 86 at the outer end thereof in which is secured a top of guide rod 87. Each guide rod extends downwardly through bushings in projecting bosses 88 and 89 on each leg of the stanchion. The top of the stanchion is provided with bumpers 90 against which the elevator seats in its lowermost position. Accordingly, extension and retraction of the elevator cylinder assembly 79 will raise and lower the elevator as shown by the full and phantom line positions seen in FIG. 2.

The top of the elevator 82 is in the form of two upstanding plates 92 and 93 which at their very top form a pivot connection 94 for the blind end of platform-tilt piston cylinder assembly 95. Extending horizontally between and beyond the vertical plates 92 and 93 is hub 96 housing pivot shaft 97 for platform 98.

The platform 98 includes a U-shape main frame 100, with the pivot 97 extending between the legs 101 and 102 thereof. The bight portion of the main frame 100 includes an upstanding clevis bracket 103 which at its top is pivotally connected at 104 to the rod of platform-tilt piston cylinder assembly 95. The clevis bracket 103 also forms a pivot connection 106 for the blind end of platform extend piston cylinder assembly 107.

The legs 101 and 102 of the main frame 100 are each provided with laterally projecting hubs 108 and 109 provided with aligned guide bushings accommodating guide rods 110 and 111 which are secured at each end to the front transverse frame member 112 and the rear transverse frame member 113 of movable platform slide frame 114. The front and rear transverse frames are interconnected by side frame members 115 and 116.

The rod 118 of the piston cylinder assembly 107 is pivotally connected at 119 to bracket 120 connected to the front transverse frame member 112 of the movable frame 114. Accordingly, extension of the piston cylinder assembly 107 as shown in FIG. 2 and 3A will move the movable frame to the left as seen in such figures, and retraction will move the slide frame to the position seen in FIG. 3B or FIG. 1 in full lines.

The platform-tilt piston cylinder assembly 95 in its fully retracted position as seen in FIG. 2, positions the platform normal to the elevator and stanchion, while in its fully extended position as seen in phantom lines in FIG. 1, positions the platform at approximately 45° with respect to the elevator and stanchion.

Referring now to FIGS. 3A and 3B, it will be seen that the longitudinal frame members 115 and 116 of the movable or slide frame 114 of the platform are each provided with laterally projecting frame members 122, 123 and 124, with the outer ends of the latter two being interconnected by frame member 125. Positioned within the confines of the frame 116 and the frames 123, 124 and 125 are two fixed tire supporting rollers 127 and 128. Rearwardly of the frame 124 is a vertically movable tire stop roller 129 which in its retracted position is aligned with the rollers 127 and 128. Positioned between the frame members 122 and 123 is a further fixed tire support roller 130.

The frame member 122 is of circular cross-section and supports roller assemblies 132 and 133 with each assembly including four equally spaced rollers with the rollers of the latter assembly 133 being substantially wider than the more narrow rollers of the assembly 132. The more narrow rollers of the assembly 132 are journalled between roller bars 134 and 135. A sleeve 136 extends between and is secured to such roller bars surrounding the circular frame member 122. The rearward end of the roller bars is provided with a tongue 137 adapted to be selectively pin-connected to a plurality of aligned apertures in plate clevis 138 projecting forwardly from the frame member 123.

Similarly, the rollers of the assembly 133 are journalled between roller bars 140 and 141 and a sleeve 142 extends between and is secured to such bars surrounding the circular frame member 122. A tongue 144 is secured to the bar 141 and sleeve 142 projecting into plate clevis 145. Again, the tongue may selectively be pin-connected to a plurality of aligned apertures in the plate clevis.

This construction permits the roller assemblies 132 and 133 to be adjusted along the circular tubular frame member 122 to be moved closer to each other as indicated by the phantom line position 147 and 148. In the embodiment illustrated in FIG. 3A, the platform may thus be adjusted to accommodate tires having a minimum bead diameter of 10 inches or a maximum bead diameter of 17½ inches.

The roller arrangement projecting from the opposite side of the platform slide frame as seen in FIG. 3B will be identical to the roller arrangement just described.

Referring now to FIG. 1, it will be seen that the tire stop roller 129 on each side of the platform is journalled between the end of L-shape arms 150, the opposite ends of which are pivoted about shaft 151. The shaft is pivoted by piston cylinder assembly 152, the rod of which is connected to crank 153 at 154. The blind end of the piston cylinder assembly 152 is pivoted to fixed bracket 155 at 156. Accordingly, retraction of the piston cylinder assembly 152 will cause the arms 150 to pivot in a counterclockwise direction as viewed in FIG. 1 elevating the tire stop roller 129. Conversely, extension of the piston cylinder assembly as shown in FIG. 1 lowers the tire stop roller to a position of alignment with the rest of the rollers on the platform permitting the tire to roll off the platform into the P.C.I.

Referring to FIG. 2, it will be seen that the front transverse frame member 112 of the platform slide frame 114 is provided with an inclined cam surface 160 cooperating with a similarly inclined surface on the top of post 161 secured at 162 to the plate 12 of the base between the two mold sections positioned thereon. The elevator 82 is also provided with an adjustable stop 163 adapted to engage the top of the plate 12 when the elevator and stanchion are in the vertical position and the elevator is down. The supports 161 and 163 provide a rigid support for the platform in its extended and horizontal position shown in full lines in FIG. 2 to react against the force of the bladder being stripped from the tire supported on the platform.

On each side of the platform 98, there is provided cam rollers 165 and 166 which are mounted on brackets 167 and 168, respectively. The bracket 167 is mounted on the projecting end of the tubular frame member 123 while the bracket 168 is mounted on the underside of frame member 125. The position of these rollers and brackets is seen in FIGS. 1 and 4. As the platform descends in its fully tilted position, roller 166 will engage inwardly projecting cam plate 170 which is mounted on the inside of vertically extending cam plate 171. This pivots the platform in a counterclockwise direction to a substantially horizontal position until the roller 165 engages the top horizontal edge of the cam plate 171 as indicated at 172.

The elevator piston cylinder assembly 79 may be hydraulic while the other piston cylinder assemblies may be pneumatic. Since both cam stop rollers 166 and 165 are to the right-hand side of the pivot of the platform as seen in FIG. 1, engagement of the rollers with their respective cam stops will cause the platform to pivot counterclockwise against any pressure in the platform-tilt piston cylinder assembly 95. The cams and followers act to straighten out the platform before it is fully down and the top edge of the long outside cam plate 171 keeps the platform off the brake housing 173 seen in FIG. 2 on top of the motor 23, as the platform rocks back to discharge position.

For smaller tires, such as passenger tires, the center supports 161 and 163 have been found to be adequate firmly to support the platform in its horizontal position beneath the cured tire to enable the bladder to be stripped downwardly therefrom. However, with larger tires, such as truck tires, it has been found that outboard supports for the platform are also required. In larger platen presses wherein a heat shield is used, clearance problems are present since the supports would interfere with the heat shields when the press closes.

Figure 5:
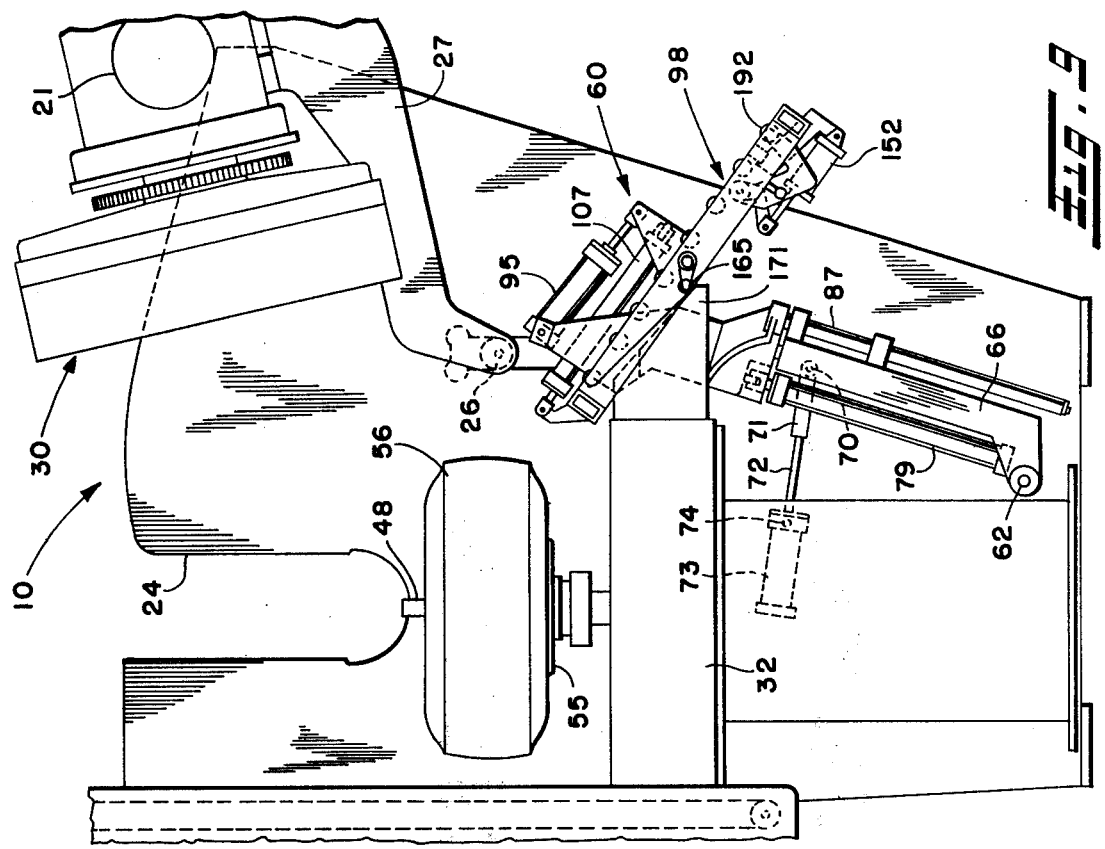
FIG. 5 is a fragmentary vertical section through the base of the press illustrating one form of the invention which may utilize pivoting support posts at the front of the press operated in conjunction with the unloader to provide rigid support for the platform.
Figure 6:
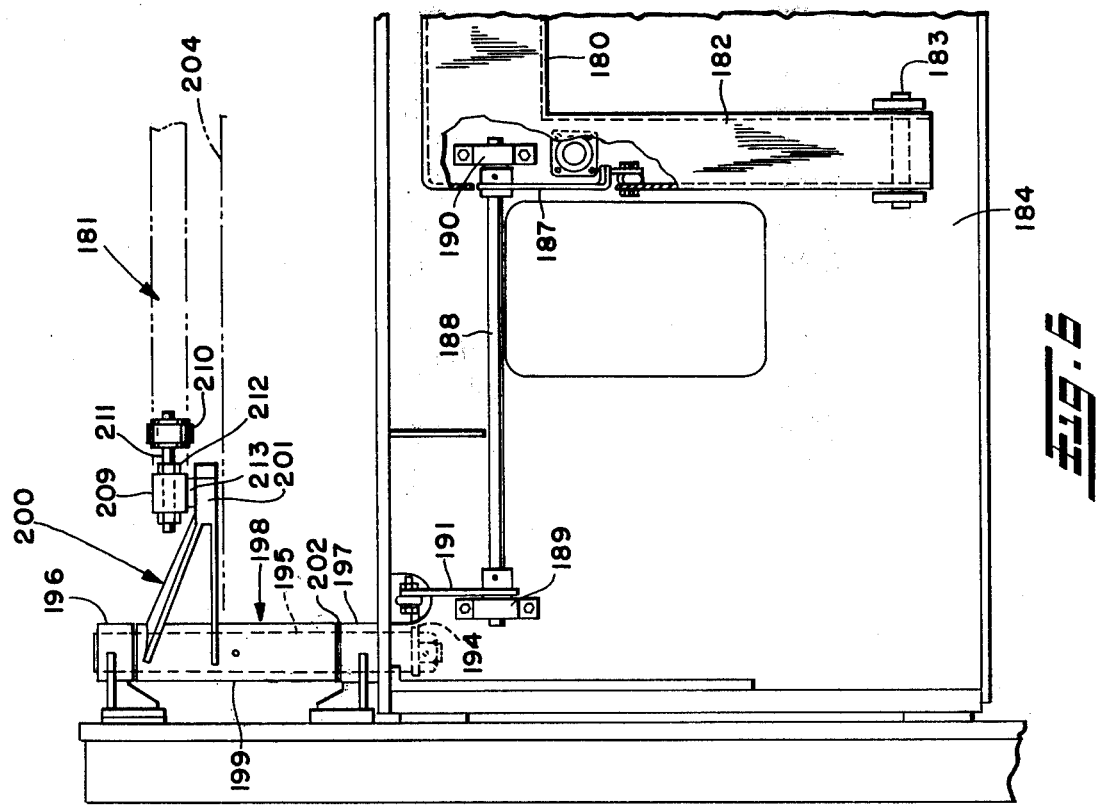
FIG. 6 is a fragmentary rear elevation partially broken away and in section showing the mechanism of FIG. 5.

Referring now to FIGS. 5, 6 and 7, there is illustrated retractable outboard supports for the platform which are operated by the unloader. Referring first to FIGS. 5 and 6, it will be seen that the inverted U-shape stanchion 180 of the unloader which supports the elevator in turn pivotally supporting the platform 181 has its legs 182 pivoted at 183 to the back of the base 184 of the press. A piston cylinder assembly, not shown but similar to the piston cylinder assembly 73 in FIG. 1, causes the stanchion to rock about the pivots from the phantom line position 185 to the full line position and vice versa. In the phantom line position, the unloader will be in its retracted position. Connected to one leg of the stanchion is adjustable link 186, the opposite end of which is connected to arm 187 which is in turn secured to rock shaft 188 which is journalled at 189 and 190 to the back of the press base. The outer end of the rock shaft has an arm 191 secured thereto, the outer end of which is connected to long link 192.

As seen in FIG. 7, the opposite end of the long link 192 is connected at 193 to arm 194 which is secured to the bottom of vertically extending shaft 195. Such shaft is journalled in and vertically supported in vertically spaced collars 196 and 197. A support 198 is mounted on the shaft between the collars and may be pinned thereto for movement with the shaft. The support 198 includes a tubular column 199 surrounding the shaft and a laterally projecting arm 200 which terminates in a flat support surface 201. Thrust washers 202 may be provided between the collars and the tubular column.

The horizontal plane of the support 201 and the arm 200 is such that it clears the bottom heat shield 204 and since the stanchion 180 can pivot to the vertical position only when the press is open, the swinging of the arm 200 from the phantom line position 205 in FIG. 7 to the phantom line position 206 can only occur when the press is open and the top heat shield is out of the way. The support will be in the phantom line position 205 when the stanchion is in the retracted position 185 and as it moves to the vertical position, the link and arm 186 and 187 cause the shaft 188 to rock moving the link 192 to the right as seen in FIG. 5 swinging the shaft and thus the support from the position 205 to the position 206. As the stanchion moves to its tilted or retracted position 185, the opposite motion occurs moving the support 201 to the phantom line position 205 seen in FIG. 7, clearing the upper heat shield 208 as the press closes. A similar mechanism connects the other leg of the stanchion to the other outboard support, not shown.

The roller supports on the slide frames for a truck tire unloader may include forwardly projecting U-shape frames, one leg of which is shown at 209 in FIG. 6. Roller frames 210 may project inwardly from such legs on adjustable rods 211. Such rods may be provided with a plurality of apertures and adjustably pinned to collars 212 to set the spacing of the roller frames. The support 201 and the leg 209 of the platform may be provided with mating inclined cam surfaces as seen at 213 to provide proper seating of the platform on the support.

OPERATION OF THE FIG. 1 EMBODIMENT

Referring now to FIGS. 8, 9, 10, 11 and 12, in that order, it will be seen that the press in FIG. 8 is closed and the tire 56 is shaped and curing. The unloader 60 is in its fully retracted position at the back of the press. In FIG. 9, the press has opened with the top mold section moving to the position 30. This strips the tire 56 from the top mold section and thereafter the bead lift cylinders 53 are retracted elevating the tire 56 to the position seen in FIG. 9, stripping the tire from the bottom mold section. The unloader 60 is still in its retracted position but may now commence its unloading operation. The first operation is the retraction of the platform-tilt piston cylinder assembly 95 which lifts the roller 165 from the top edge of the cam 171 positioning the platform 98 normal to the stanchion 66. This position is seen in phantom lines at 220 in FIG. 10. At this time, the tire stop roller 129 will be elevated by retraction of the piston cylinder assembly 152. Next, the piston cylinder assembly 73 retracts moving the stanchion to its vertical position. The piston cylinder assembly 107 now extends moving the laterally extending tire supporting roller portions of the platform beneath the tire 56 to the FIG. 10 full line position. The platform in this position will be firmly supported on the post 161 and by the adjustable stop 163 seen in the full line position in FIG. 2.

At this point, the post 48 is elevated moving the top bead clamping ring assembly 46 of the bladder to the position seen at 221. This partially strips the bladder 45 from the cured tire 56. Now, the bead lift cylinders 53 are extended stretching the bladder to its cylindrical condition seen in FIG. 11 and stripping the same completely from the tire 56. As indicated, this may create a significant downward force on the tire which will be supported on the firmly supported platform now therebeneath.

As seen in FIG. 11, when the bladder has cleared the tire and the tire is supported on the platform, the piston cylinder assembly 79 extends elevating the platform 98 to the position shown in full lines in FIG. 11 at 223 or at phantom lines in FIG. 2. The platform now tilts back to its maximum extent by extension of the piston cylinder assembly 95 which position is shown in phantom lines in FIG. 11 at 224 and in phantom lines in FIG. 1. The elevation and tilting of the platform as described causes the tire 56 to clear the upstanding post 48. The tire now rolls downwardly against the tire stop roller 129. In such tilted position, the platform now retracts by the retraction of the piston cylinder assembly 107.

The elevator now descends by retraction of the piston cylinder assembly 79. During such descent, the piston cylinder 95 may be vented or provided with slight pressure. The cam roller 166 first hits the cam surface 170 causing the platform to initiate its pivot to a horizontal position and coming to rest with the roller 165 against the top horizontal cam surface 172. This causes the tire 56 in effect to dip under the top mold section heat shield 33 and come to rest in the intermediate horizontal position seen in full lines in FIG. 12. The relative positions of the platform pivot 97 and the roller 165 are seen in FIG. 12. Accordingly, downward movement of the platform by retraction of the piston cylinder assembly 79 forces the platform to its substantially horizontal full line position and it will be held in such position by the engagement of the roller and cam. Now, extension of the piston cylinder assembly 73 with pressure in the piston cylinder assembly 95 causes the platform to move to the full line position seen in FIG. 1 or the phantom line position 226 seen in FIG. 12. The roller 165 will ride down the inclined top surface of the cam 171 maintaining the platform in an intermediate tilted position and the pressure in the piston cylinder assembly 95 maintains the roller in engagement with the cam. The tire stops 129 are now lowered by extension of the piston cylinder assembly 152 and the tire rolls into the P.C.I. The press is now clear of the cured tire and ready for loading and closing.

FIG. 13 EMBODIMENT

In FIG. 13 there is illustrated an embodiment of the present invention which may be utilized with a press wherein the top mold section does not tilt in its fully opened position but which maintains its parallelism with the bottom mold section 230 mounted on base plate 231 of base 232. The unloader includes a dog leg stanchion 234 pivoted at 235 at the back of the press base. The stanchion supports elevator 236 which is raised and lowered with respect to the stanchion by piston cylinder assemblies 237, one on each leg of the stanchion. Guide rods 238 secured to the elevator extend through guide bushings in the stanchion legs.

A piston cylinder assembly 240 has its blind end pivotally connected at 241 to the upper rear of the base 232. The rod of such piston cylinder assembly is connected at 242 to the stanchion. The stanchion is shown in full lines with the piston cylinder assembly 240 extended and in its fully retracted position. Retraction of the piston cylinder assembly 240 will move the stanchion to a vertical position. The elevator 236 pivotally supports at 244 platform 245. The platform is pivoted with respect to the elevator by piston cylinder assembly 247, the blind end of which is connected at 248 to an upstanding projection 249 on the elevator 236. The rod of the piston cylinder assembly 247 is connected at 250 to bracket 251 secured to the front of the platform 245. The platform comprises a center portion with two laterally extending roller platforms, the rear of each of which is provided with a tire stop roller 253 mounted on arms 254, raised and lowered by the pivoting of shaft 255 by means of the piston cylinder assembly 256, the rod of which is connected to such shaft by arm 257.

The plate 231 is provided with an upstanding post 260 having an adjustable rest button 261 thereon. The elevator is provided with adjustable support stops 263 and 264 which may engage fixed abutments 265 and 266, respectively, when the stanchion is pivoted to its vertical position. Unlike the embodiments previously described, the platform 245 does not include an extensible slide and is fixed in its configuration save for its ability to pivot about the elevator mounting pivot 244.

In the unloader's initial position, the stanchion is rocked back to its inclined position seen in full lines and the platform is fully tilted with respect to the stanchion so that the platform achieves the sharply angled or almost vertical position seen in phantom lines at 270. In this position, the platform will clear the upper mold section for opening and closing of the press. When the press is opened and the tire 271 has been elevated to the position shown by the retraction of the bead lift cylinders 272, the unloader platform first pivots to the full line position shown which is normal to the retracted stanchion. The piston cylinder assembly 240 is now retracted pivoting the stanchion until the platform is horizontal and positioned beneath the tire as shown by the phantom line position 273. In such position, the platform will be supported rigidly by the abutments provided.

After the bladder is stripped downwardly and cleared from the tire, the platform is elevated in its horizontal position by extension of the piston cylinder assemblies 237 to achieve the phantom line position seen at 274. Next, the platform is tilted by retraction of the piston cylinder assembly 247 and the tire rolls downwardly to the rear end of the platform against the tire stop roller 253 to the position seen at 275. From the position 275 to the entry roller 276 of the P.C.I., the tire may take several paths. The tilting of the platform simply rolls the tire to the rear of the platform clear of the upstanding bladder 277. Accordingly, the platform can now descend to its lower position, return to its horizontal position and then rock back to the full line position to place the tire as shown at 278 at the entry of the P.C.I. Other alternative paths would be to rock the stanchion back while returning the platform to its position normal to the stanchion and simultaneously causing the platform to descend. In any event, the platform is shifted so that the tire moves from the position 275 to the position 278 and at such latter position, the tire stop rollers 253 are withdrawn permitting the tire to roll into the P.C.I. However, before the press closes, the platform returns to its pivoted condition wherein it is nearly vertical as shown by the phantom line position 270 to clear the press as it closes.

With the unloader of FIG. 13, the extensible tire platform is not required nor is there a requirement of cam stops enabling the loader to dip to an intermediate horizontal position. When not in use, the unloader platform is substantially vertically positioned clear of the moving parts of the press.

We, therefore, particularly point out and distinctly claim is our invention:

1. A tire unloader for a tire press of the type including a stationary bottom mold section and a movable top mold section, the latter being movable to open and close the press, said unloader comprising a platform having a proximal and distal end, an elevator stanchion pivotally supporting said platform at its proximal end, said stanchion being pivotally mounted for swinging the platform above the bottom mold section when the press is open, support means underlying the distal end of said platform to rigidify the same when thus in position to receive the tire, and means responsive to the pivoting of said stanchion to move said support means to and from an operative position.

2. A tire unloader as set forth in claim 1 including means to pivot the platform to a substantially vertical position when the unloader is not in use.

3. A tire unloader as set forth in claim 1 wherein the support means is mounted for horizontal swinging movement to clear the top mold section as the press closes.

4. A tire unloader for a tire press of the type including a stationary bottom mold section and a movable top mold section, the latter being movable to open and close the press, said unloader comprising a platform having a proximal and distal end, an elevator stanchion pivotally supporting said platform at its proximal end, said stanchion being pivotally mounted for swinging the platform above the bottom mold section when the press is open, support means underlying the distal end of said platform to rigidify the same when thus in position to receive the tire, and means responsive to the pivoting of said stanchion to move said support means to and from an operative position, said last mentioned means including linkage means interconnecting said support means and stanchion.

5. A tire unloader as set forth in claim 4 wherein said support means is mounted for horizontal swinging movement.

6. A tire unloader as set forth in claim 5 wherein said linkage means causes the support means to swing in a direction opposite that of the stanchion.

7. A tire unloader for a tire curing press of the type having a stationary bottom mold section and a movable top mold section, the latter being movable to open and close the press, said unloader comprising a platform, an elevator stanchion pivotally mounted at its lower end and pivotally supporting said platform at its upper end, whereby, when the press is opened, said platform may be pivoted from a retracted position to an extended horizontal position beneath the cured tire after it is stripped from the bottom mold section to provide a firm support thereof, said platform being mounted for fore and aft movement of said platform-stanchion pivot.

8. A tire unloader as set forth in claim 7 wherein said platform includes a main frame pivoted to said elevator stanchion, and a slide frame including fore and aft guide rods supported and slide guided by said main frame.

9. A tire unloader as set forth in claim 8 wherein said slide frame includes a laterally extending tire supporting roller platform on each side thereof.

10. A tire unloader as set forth in claim 9 wherein each roller platform includes at the forward end thereof laterally spaced roller sets.

11. A tire unloader as set forth in claim 10 including means laterally to adjust said roller sets.

12. A tire unloader as set forth in claim 10 including a retractable tire stop at the rear of each roller platform.

13. A tire unloader as set forth in claim 12 wherein said tire stop comprises a roller which when retracted forms a continuation of the roller platform.

14. A tire unloader for a tire curing press of the type having a stationary bottom mold section and a movable top mold section, the latter being movable to open and close the press, said unloader comprising a platform, an elevator stanchion pivotally mounted at its lower end and pivotally supporting said platform at its upper end, whereby, when the press is opened, said platform may be pivoted from a retracted position to an extended horizontal position beneath the cured tire after it is stripped from the bottom mold section to provide a firm support therefor, and cam stop means to cause said platform to pivot to a substantially horizontal position as the elevator stanchion descends.

15. A tire unloader as set forth in claim 14 wherein said cam stop means comprises rollers on said platform and fixed cams, said rollers being spaced from said platform-stanchion pivot to cause said platform to pivot to and stop in such substantially horizontal position.

16. A tire unloader as set forth in claim 15 including two cams, and respective rollers on said platform, one cam and roller initiating the tilting of said platform and the other cam and respective roller completing the tilt of the platform and holding the same in such substantially horizontal position.

17. A tire unloader as set forth in claim 16 wherein said other cam includes a sloping guide surface and pressure means to hold said respective roller on said guide surface as said stanchion pivots backwardly.

18. A tire unloader for a tire curing press of the type having a stationary bottom mold section and a movable top mold section, the latter being movable to open and close the press, said unloader comprising a platform, an elevator stanchion pivotally mounted at its lower end and pivotally supporting said platform at its upper end, whereby, when the press is opened, said platform may be pivoted from a retracted position to an extended horizontal position beneath the cured tire after it is stripped from the bottom mold section to provide a firm support therefor, means to pivot said elevator stanchion to and from a vertical position, means to pivot said platform to and from a position normal to said elevator stanchion and a position inclined rearwardly of said elevator stanchion, means to elevate said platform when said stanchion is vertical and said platform is normal thereto to lift a tire, means to tilt said platform rearwardly when thus elevated to lift such tire over a center mechanism of the press and to roll by gravity to the rear of said platform, and means to lower said platform while tilted and then reposition the same normal to said elevator stanchion.

19. A tire unloader as set forth in claim 18 including means to rock said elevator stanchion rearwardly causing said platform again to tilt to discharge the tire therefrom.

20. A tire unloader as set forth in claim 19 including means to pivot said platform to a substantially vertical position after the tire is discharged to clear the press for closing.

21. A tire unloader for a tire curing press of the type having a stationary bottom mold section and a movable top mold section, the latter being movable to open and close the press, said unloader comprising a platform, an elevator stanchion pivotally mounted at its lower end and pivotally supporting said platform at its upper end, whereby, when the press is opened, said platform may be pivoted from a retracted position to an extended horizontal position beneath the cured tire after it is stripped from the bottom mold section to provide a firm support therefor, means to pivot said elevator stanchion to and from a vertical position, means to pivot said platform to and from a position normal to said elevator stanchion and a position inclined rearwardly of said elevator stanchion, means to elevate said platform when said stanchion is vertical and said platform is normal thereto to lift a tire, means to tilt said platform rearwardly when thus elevated to lift such tire over a center mechanism of the press and to roll by gravity to the rear of said platform, and means to move said platform fore and aft of its pivot.

22. A tire unloader as set forth in claim 21 including means to move said platform forward of its pivot prior to elevation and when said platform is normal to said stanchion.

23. A tire unloader as set forth in claim 22 including means to move said platform aft of its pivot after elevation and rearward tilting of said platform.

24. A tire unloader for a tire curing press of the type having a stationary bottom mold section and a movable top mold section, the latter being movable to open and close the press, said unloader comprising a platform, an elevator stanchion pivotally mounted at its lower end and pivotally supporting said platform at its upper end, whereby when the press is open, said platform may be pivoted from a retracted position to an extended horizontal position beneath the cured tire after it is stripped from the bottom mold section to provide a firm support therefor, said elevator stanchion including an elevator mounted on a stanchion for vertical movement, said platform being pivoted to said elevator, guide means on said elevator guided by said stanchion, and piston-cylinder means interconnecting said elevator and stanchion to elevate and lower said elevator, and means to pivot said elevator stanchion to and from a vertical position.

25. A tire unloader as set forth in claim 24 wherein said platform includes a center portion pivoted to said elevator stanchion and a laterally extending roller platform on each side thereof.

26. A tire unloader as set forth in claim 25 wherein each roller platform includes at the forward end thereof laterally spaced roller sets.

27. A tire unloader as set forth in claim 26 including means laterally to adjust said roller sets.

28. A tire unloader as set forth in claim 27 wherein said means laterally to adjust said roller sets comprises a plurality of pin and aperture connecting means.

29. A tire unloader as set forth in claim 25 including a retractable tire stop at the rear of each roller platform.

30. A tire unloader as set forth in claim 29 wherein said tire stop comprises a roller which when retracted forms a continuation of the roller platform.

31. A tire unloader as set forth in claim 24 including means to pivot said platform to and from a position normal to said elevator stanchion and a position inclined rearwardly of said elevator stanchion.

32. A tire unloader as set forth in claim 31 including means to elevate said platform when said stanchion is vertical and said platform is normal thereto to lift a tire.

33. A tire unloader as set forth in claim 32 including means to tilt said platform rearwardly when thus elevated to lift such tire over a center mechanism of the press and to roll by gravity to the rear of said platform.

* * * * *